Figure 1:
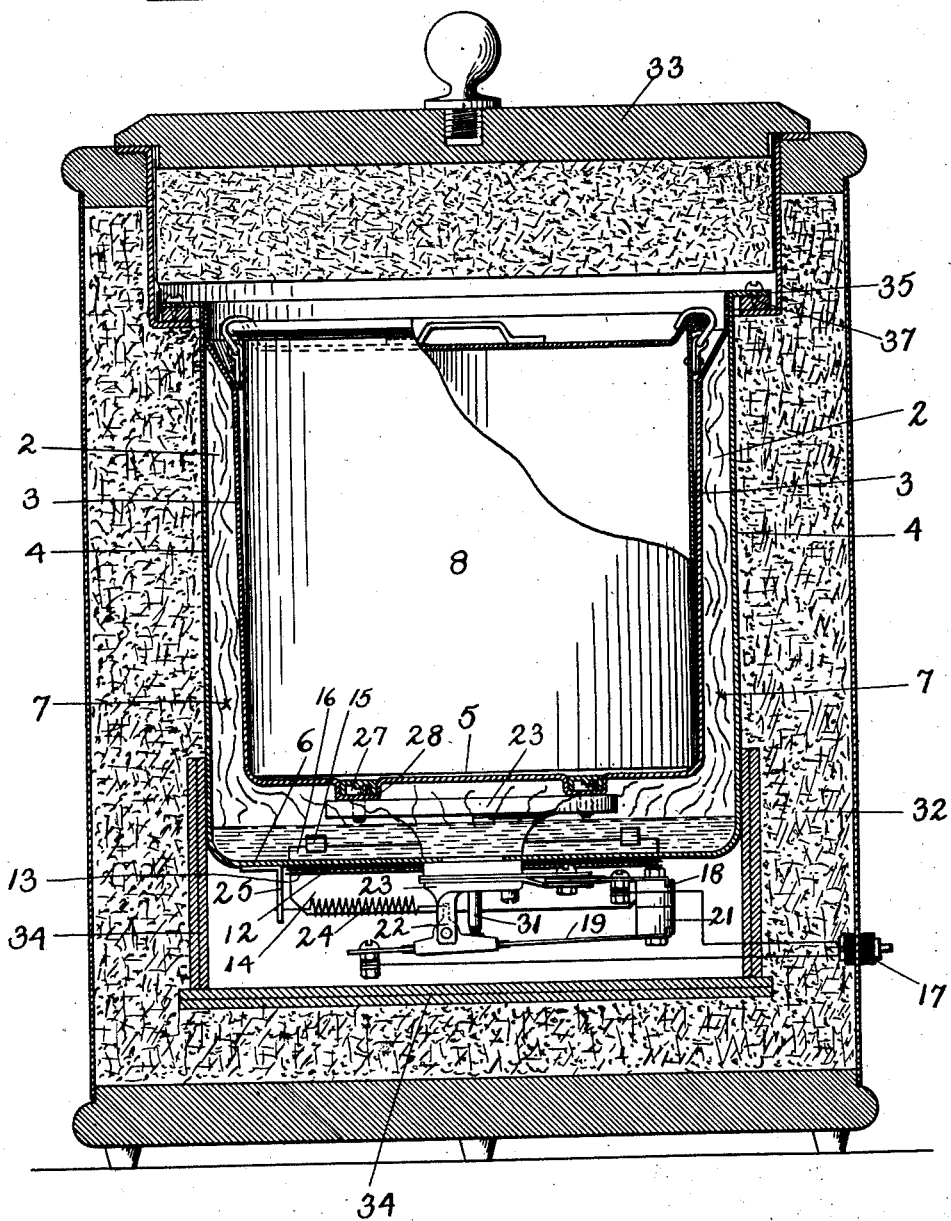

A. J. KERCHER.
ELECTRICALLY HEATED COOKER.
APPLICATION FILED NOV. 13, 1911.

1,047,418.

Patented Dec. 17, 1912.
2 SHEETS—SHEET 1.

WITNESSES:

INVENTOR
ARTHUR J. KERCHER.
BY
HIS ATTORNEYS

UNITED STATES PATENT OFFICE.

ARTHUR J. KERCHER, OF BERKELEY, CALIFORNIA, ASSIGNOR TO BERKELEY ELECTRIC COOKER COMPANY, OF BERKELEY, CALIFORNIA, A CORPORATION OF CALIFORNIA.

ELECTRICALLY-HEATED COOKER.

1,047,418.  Specification of Letters Patent.  Patented Dec. 17, 1912.

Application filed November 13, 1911. Serial No. 659,894.

*To all whom it may concern:*

Be it known that I, ARTHUR J. KERCHER, a citizen of the United States, and a resident of Berkeley, county of Alameda, and State of California, have invented certain new and useful Improvements in Electrically-Heated Cookers, of which the following is a specification.

The invention relates to cookers which are adapted to be heated to the proper temperature by means of an electric current and more particularly to a device in which the electric circuit is automatically opened and closed to maintain the temperature substantially constant.

The object of the invention is to provide an electrically heated cooker in which the electric current is automatically controlled to maintain a substantially constant temperature within the cooker.

Another object of the invention is to provide an electrically heated cooker in which the electric current is controlled by variations in pressure within the cooker caused by variations in temperature.

A further object of the invention is to provide an electrically heated cooker provided with a quick throw switch in the electric circuit which is operated by variations in pressure within the cooker.

A further object of the invention is to provide an electrically heated cooker in which no thermal connection is established between the heating units and the outside air, so that all of the heat generated is utilized in cooking.

The device possesses other advantageous features, which, with the foregoing will be set forth at length in the following description, where I shall outline in full that form or embodiment of the invention which I have selected for illustration in the drawings, accompanying and forming part of the present specification. The novelty of the invention will be included in the claim succeeding said description. From this it will be apparent that I do not restrict myself to the showing made by such drawings and descriptions as I may adopt many variations within the scope of my invention as expressed in said claims.

Figure 2:
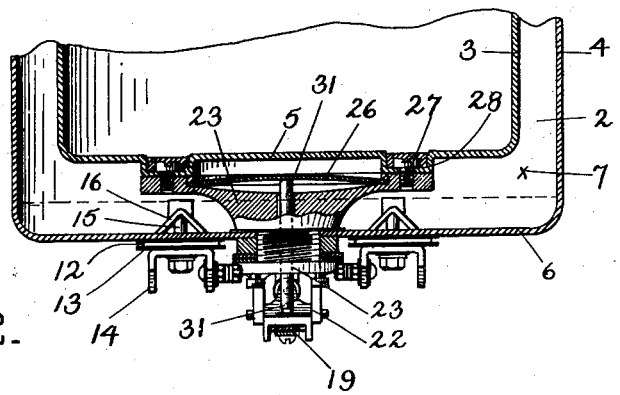
Figure 3:
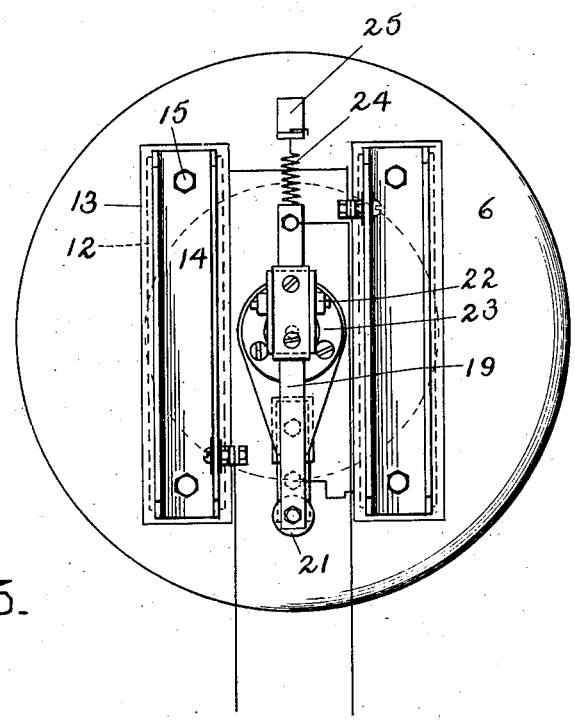

Referring to the drawings:—Figure 1 is a vertical section of the cooker of my invention completely inclosed in an envelop of heat insulating material. Fig. 2 is a vertical section through the lower part of the cooker and the quick throw switch. Fig. 3 is a plan view of the under side of the cooker showing the switch and the heating units.

The heating element is adapted to heat a body of liquid in a closed receptacle from which the heat is transferred to the substance to be cooked and the regulating and controlling means is arranged to be operated by the change in pressure within the receptacle, caused by a change in temperature. At a given temperature a certain pressure is obtained and the controlling mechanism is arranged to open the circuit when such temperature is exceeded and to close the circuit when the temperature drops below this point. By this means the substance to be cooked is subjected to a substantially constant even temperature and is cooked to better advantage than in instances where the temperature varies in any substantial degree.

By inclosing the cooker in an envelop of heat insulating material, all of the heat generated by the electric current is available to cook the material and a very efficient cooker is obtaned, but it is evident that the cooker could be used without the heat insulating material and perform its functions although in a less efficient manner.

The current controlling apparatus comprises a quick-throw switch which is operated by changes in the pressure to open and close the electric circuit. This type of switch is advantageous in that it immediately breaks the circuit when the critical pressure is reached and separates the contacts abruptly, so that no sparking or arcing occurs. The advantage of the quick separation or contacting of the terminals is apparent to those familiar with the use of electric currents and needs no further explanation.

The cooker consists of a receptacle 2 having double side walls 3—4 and double bottom walls 5—6 spaced apart to form a chamber 7 therebetween. The side wall 3 and the bottom wall 5 are formed integral and the side wall 4 and the bottom wall 6 are formed integral, and the side walls 3 and 4 are secured together at their upper ends. This joint is formed by alloying or fusing the metal of the two walls together thereby forming an air tight chamber 7. The side walls may be formed perpendicular, as shown, or may be inclined, depending upon the shape of the cooking vessel 8, which is to be placed in the cooker.

A quantity of water or other liquid is placed in the chamber 7 so that it completely covers the bottom thereof and the chamber is exhausted so that a vacuum exists therein. This is preferably accomplished by providing a small vent to the chamber and heating the water therein to the boiling point, so that the air therein is expelled and only steam and water remain in the chamber. The vent is then sealed and as the receptacle cools a vacuum is formed in the chamber. Therefore, as the receptacle is subsequently heated, the pressure therein equals that of the atmosphere when the temperature of the water and steam reaches 212° Fahrenheit. A further rise in temperature above this point increases the pressure within the chamber and the electric circuit is automatically opened.

The heating units 12 of any suitable construction are arranged on the bottom 6 of the receptacle 2 and are spaced apart therefrom by a strip of thin insulation 13, such as mica. These units 12 are held in place by the short channel bars 14, from which they are also insulated. The channels 14 are held in place by bolts 15 passing through the bottom wall 6 and engaging angles 16 within the chamber. The joints between the bolts and the bottom wall 6 are preferably alloyed to prevent any leakage. This construction acts to stiffen the bottom wall 6 and prevent it from collapsing as the receptacle cools and a vacuum is formed therein.

In the interior electric circuit which terminates at the plug 17, I have placed a quick throw electric switch which is operated by variations in pressure within the chamber to open and close the circuit. The switch comprises an upper or stationary arm carrying contact 18 and a lower movable arm 19 carrying contact 21. The arm 19 is pivoted in a bracket 22 which is attached to the casing 23, the outer or contact end of the arm being pressed upward normally by the spring 24 attached to an ear on the arm and to a bracket 25 attached to the bottom of the receptacle. This bracket 25 is attached to the bottom 6 by an alloy which melts at a temperature above 212° Fahrenheit, so that, should the switch fail to operate to open the circuit at the proper temperature, a further rise in temperature will melt the alloy, release the spring 24 and allow the arm 19 to drop and thereby open the circuit.

Within the chamber 7, and secured in the casing 23 is a spring diaphragm of the buckling type 26, which is sprung into its opposite positions by variations in pressure within the chamber. The connection between the spring diaphragm and the supporting casing is alloyed to prevent leakage. The casing is supported in the chamber by the screws 27 passing through depressed portions 28 in the bottom wall 5. These depressions serve to space the diaphragm away from the bottom 5, and also allow the bottom to be flush on the inside. After the screws are seated, an alloy is placed in the depressions to insure a hermetic seal. Arranged in the casing 23 with its ends in close relation with the diaphragm and the arm 19 is a movable pin 31 which transfers the motion of the diaphragm to the switch arm. Ordinarily the diaphragm is flexed upward and the switch is closed, but when the pressure within the chamber reaches a certain critical point, the diaphragm springs or buckles to its reverse position, abruptly separating the contacts and opening the circuit. Similarly, as the pressure subsequently decreases, the diaphragm springs back and allows the switch to close quickly. For the purpose of retaining the heat therein, the cooker is inclosed in an envelop of heat insulating material 32 completely surrounding it on the sides and bottom and a removable cover 33 is provided to close the top. I have also considered it advisable to surround the heating units and the switch with sheets 34 of asbestos or other fire proof material.

The cooker is supported in the heat insulating container by the annular metallic ring 35 bearing against the top of the receptacle 2. In order to prevent the loss of heat through the ring 35 I interpose a ring 37 of packing or other poor heat conducting material between the receptacle 2 and the ring 35, so that the thermal connection is broken and the heat may not be lost by conduction.

I claim:

1. An electrically heated cooker comprising a vacuumized receptacle partly filled with liquid and a heating element in close relation to said receptacle.

2. An electrically heated cooker comprising a vacuumized receptacle partly filled with liquid, a heating element in close relation to said receptacle, an electric circuit for the heating element and a quick throw switch in said circuit said switch being arranged adjacent said receptacle.

3. An electrically heated cooker comprising a vacuumized receptacle partly filled with liquid, a heating element in close relation to said receptacle, a spring diaphragm of the buckling type within said receptacle, an electric circuit for the heating element, and a switch in said circuit arranged to be operated by said diaphragm.

4. An electrically heated cooker comprising a vacuumized receptacle partly filled with liquid, a heating element in close relation to said receptacle, an electric circuit for the heating element and a quick throw switch in said circuit adapted to be operated by variations in pressure within said receptacle.

5. An electrically heated cooker comprising a vacuumized receptacle partly filled with liquid, a heating element arranged externally of the receptacle upon the wall thereof, a spring diaphragm of the buckling type within said receptacle adapted to be sprung by variations in pressure therein, an electric circuit for the heating element, a quick throw switch in said circuit and means connecting said switch and said diaphragm.

6. In an electrically heated cooker, a heating element, an electric circuit for the heating element, a switch in said circuit, a spring adapted to hold said switch in the closed position and means for releasing said spring and allowing the switch to open, when the temperature exceeds a certain maximum.

7. In an electrically heated cooker, a receptacle having a closed chamber therein, a heating element in close relation thereto, an electric circuit for the heating element, a switch in said circuit, a buckling diaphragm in said receptacle adapted to be operated by variations in pressure therein, means connecting said diaphragm with the movable arm of the switch, means tending to hold said arm in the closed position and means operating to release said holding means when the temperature in the receptacle reaches a certain maximum.

8. The combination of a casing of heat insulating material, a cover therefor, a vacuumized receptacle within said casing, a heating element in close relation to said receptacle an electirc circuit for the heating element and a quick throw switch in said circuit adapted to be operated by variations in pressure within the receptacle.

9. An electrically heated cooker comprising a vacuumized receptacle having a depression therein adapted to receive the material to be cooked, said receptacle being partly filled with water, heating elements attached to the bottom thereof, an electric circuit for the heating element and a switch in said circuit adapted to be operated by variations in pressure within the receptacle.

10. An electrically heated cooker comprising a hermetically sealed vacuumized receptacle partly filled with liquid, heating elements arranged adjacent and external thereto at the bottom, an electric circuit for the heating element, a quick throw switch in said circuit provided with means for holding it normally in the closed position, a spring diaphragm of the buckling type arranged within the receptacle adapted to be sprung by variations in pressure within the receptacle and a pin coacting with said diaphragm and switch, adapted to open said switch abruptly as the diaphragm springs downward.

In testimony whereof, I have hereunto set my hand at San Francisco, Cal., this 6th day of November, 1911.

ARTHUR J. KERCHER.

In presence of—
H. G. PROST,
R. HEFFERMAN.